June 11, 1957  E. K. THORNE  2,795,252
SOFT BOILED EGG CUTTER
Filed July 14, 1954  2 Sheets-Sheet 1
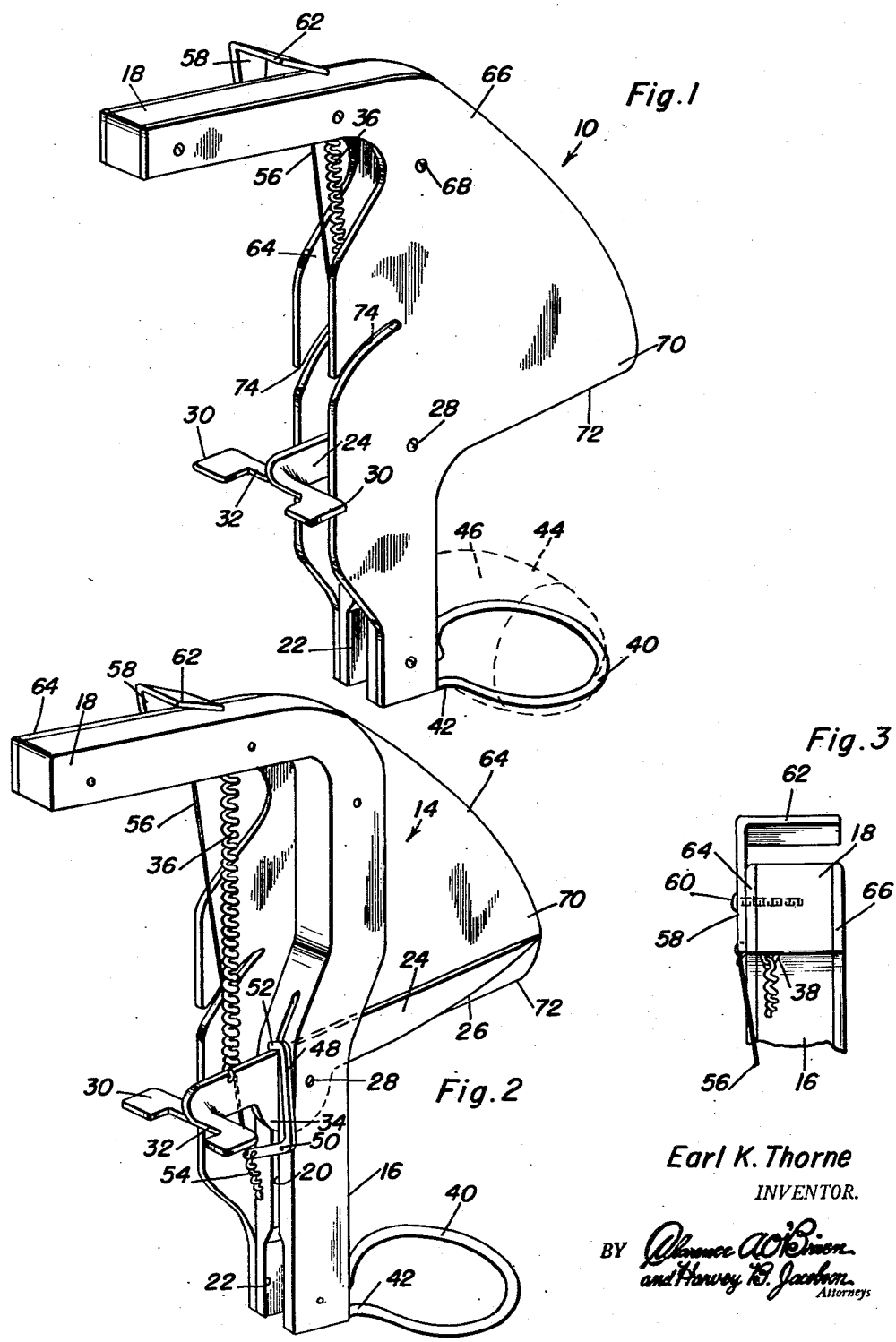
Earl K. Thorne
INVENTOR.

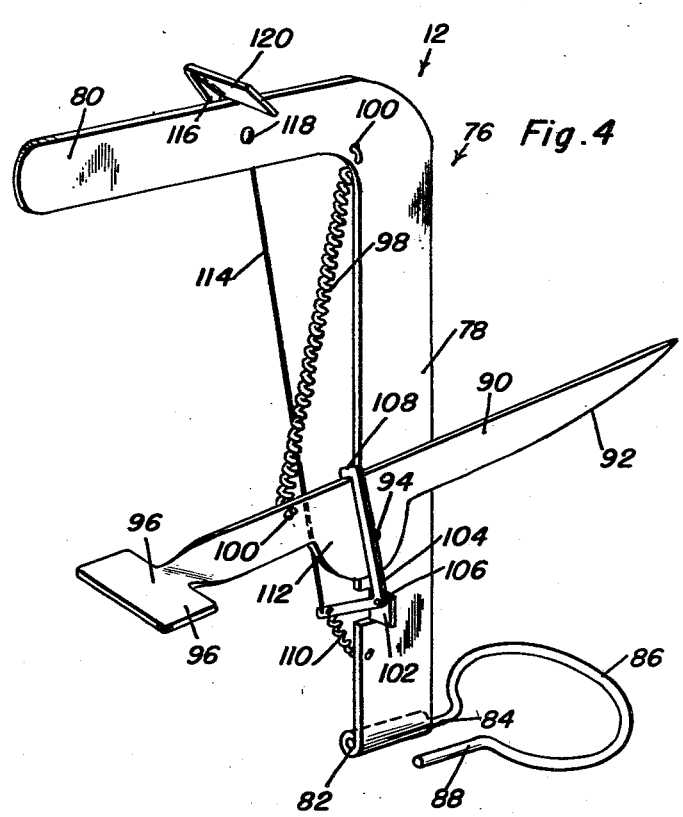
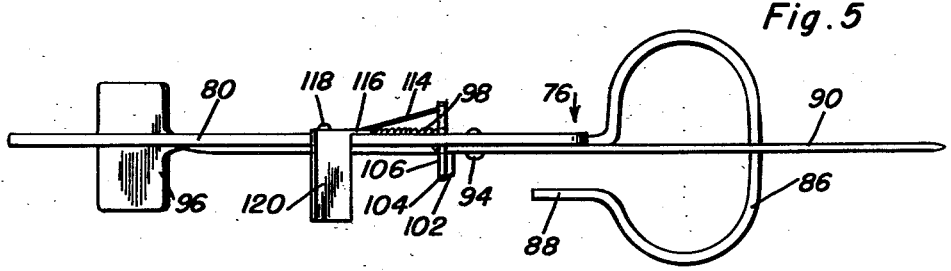

United States Patent Office 2,795,252
Patented June 11, 1957

2,795,252

SOFT BOILED EGG CUTTER

Earl K. Thorne, Pomeroy, Pa.

Application July 14, 1954, Serial No. 443,207

2 Claims. (Cl. 146—2)

This invention relates to a soft boiled egg cutter and more specifically provides a device for easily and quickly opening a soft boiled egg without encountering the usual messiness in opening soft boiled eggs.

An object of this invention is to provide a soft boiled egg cutter that includes means for scooping out the egg from the hot water and retaining the egg in position for engagement by a pivotally mounted cutter that slices through an arc of substantially 180° at the center portion of the egg thereby forming a slot in the egg for permitting the egg to be opened in an efficient and sanitary manner.

Another object of this invention is to provide a soft boiled egg cutter that is simple in construction, easy to operate, sanitary, well adapted for its intended purposes and relatively inexpensive to manufacture.

A further object of this invention is to provide a soft boiled egg cutter that includes a spring loaded pivotal knife for slicing through the egg and a releasable latch member for retaining the knife in cocked position wherein the egg cutter may be easily operated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the egg cutter of the present invention;

Figure 2 is a perspective view similar to Figure 1 with one side portion of the casing removed;

Figure 3 is a detailed end view showing the construction of the operating handle for actuating the pivotal latch member;

Figure 4 is a perspective view showing a modified form of the egg cutter of the present invention; and Figure 5 is a top plan view of the construction of Figure 4 showing the details of construction and the relationship of the component parts of the egg cutter.

Referring now specifically to the drawings, it will be seen that the numeral 10 generally designates the soft boiled egg cutter of the present invention as illustrated in Figures 1–3 and the numeral 12 designates the soft boiled egg cutter as illustrated in Figures 4 and 5, wherein both of the forms of the device operate in substantially the same manner.

Referring now specifically to Figures 1–3, it will be seen that the soft boiled egg cutter 10 includes a frame member 14 including a vertical portion 16 and a horizontal portion 18 with the horizontal portion 18 located and formed integrally of the upper end of the vertical portion 16. The vertical portion 16 is provided with an elongated notch or slot 20 that is enlarged at its lower end as indicated by the numeral 22. An elongated knife member 24 having an arcuate sharpened edge 26 at its bottom edge is pivotally mounted within the slot 20 by a pivot pin 28. The end of the knife member 24 oppositely from the sharpened edge 26 is provided with offset handle members 30 that are connected to the knife member 24 by areas of reduced size 32 for a purpose described hereinafter. The portion of the knife member 34 that surrounds the pivot pin 28 is provided with a semi-circular portion 34 and the pivot pin 28 is so located so that the upper edge of the knife member 24 will engage the upper closed end of the slot 20 thereby limiting the downward pivotal movement of the knife member 24.

A tension coil spring 36 is attached between the horizontal portion 18 of the frame 14 and the upper edge of the knife member 24 adjacent the handles 30. The spring 36 is attached by suitable eye members 38 wherein the knife 24 will be urged about pivot pin 28 with the sharpened edge 26 moving downwardly towards the widened end 22 of the slot 20. A generally loop shaped wire member 40 is secured to the lower end of the vertical portion 16 of the frame 14 and the loop 40 is provided with spaced ends 42 that are secured to the spaced ends of the vertical portion 16 that are formed by the widened portion 22 of the notch 20. As shown in Figure 1, an egg 44 is positioned on the loop 40 and the knife 26 will move thereacross for slotting the central portion as indicated by the numeral 46.

A generally L-shaped latch 48 is pivotally connected at its corner to the rear portion of the vertical member 16 of the frame 14 and the pivot pin 50 is positioned below the knife member 24 and the upper end of the vertical leg of the L-shaped member 48 is indicated by numeral 52 wherein the inturned end portion 52 engages over the upper edge of the knife 24 thereby retaining the knife in substantially horizontal position. A tension spring 54 interconnects the end of the horizontal portion of the L-shaped member 48 and the vertical portion 16 of the frame 14 wherein the L-shaped member 48 is retained with the inwardly projectifing end 52 in engagement with the knife 24. A wire member 56 is also connected to the end of the horizontal portion of the L-shaped member 48 and also connected to one end of a pivotal actuating member 58 that is pivotally secured to the horizontal member 18 by a pivot pin 60 and includes a thumb engaging portion 62 projecting across the upper surface of the horizontal member 18 in spaced relation thereto wherein the L-shaped member 48 may be pivoted about pivot point 50 for retracting the inturned end member 52 from engagement with the knife member 24.

It will be seen that a pair of side members 64 and 66 are attached to the frame 14 throughout its length by fastening members 68 and the members 64 and 66 include forwardly projecting shield portions 70 which include a horizontal lower edge 72 that is substantially coextensive with the sharpened edge 26 of the knife 24 wherein the knife 24 is encased between the shields 70 when in its retracted or set position. The rear edges of the side members 64 and 66 are provided with inwardly extending arcuate slots 74 that are arcuated about a center formed by the pivot pin 28 for the knife member 24 wherein the arcuate slots 74 slidably receive the reduced portions 32 of the handles 30 thereby limiting the pivotal movement of the knife 24.

In operation, the soft boiled egg cutter 10 is grasped by the handle formed by the horizontal portion 18 of the frame 14 and the loop 40 is positioned under an egg in the boiling water and the egg is lifted therefrom with the loop 40. With the knife 24 in its set or cocked position and the egg 44 positioned closely over a dish or receptacle in which the egg will be placed, the thumb engaging portion 62 of the actuating member 58 is pressed downwardly thereby raising up the horizontal portion of the L-shaped member 48 and moving the inturned end 52 out of engagement with the upper surface of the knife member 24. The tension spring 36 will then urge the knife 24 about pivot pin 28 wherein the sharp edge 26 will engage the egg 44 along a line defined by the numeral 46 thereby slotting a portion of the egg adjacent the center thereof. This is accomplished by the fact that the loop portion 40 is centered so that the egg will normally be supported in the path of movement of the knife 24 so that only the center portion will be slotted. This eliminates the usual running of the egg yolk that is normally encountered when a soft boiled egg is opened. In order to reset the cutter 10, it is only necessary to push against the handle members 30 until the knife member 24 is again positioned in substantially horizontal position so that the spring 54 will urge the L-shaped member 48 and the inturned end 52 thereon into engagement with the upper edge of the knife 24. The semi-circular portion 34 on the knife 24 permits the inturned end 52 to ride against the surface thereof during the pivotal movement of the knife 24 wherein the knife 24 will be automatically held in retracted position by the L-shaped member 48 and the inturned end 52 thereon.

Referring now specifically to Figures 4 and 5 wherein a simplified form of the soft boiled egg cutter is illustrated and indicated by the numeral 12, it will be seen that the cutter 12 includes a right angled frame member 76 having a vertical leg 78 and a horizontal leg 80. The vertical leg 78 is provided with a rolled portion 82 at its bottom end for receiving one leg 84 of a loop member 86 having free leg members 84 and 88 that project laterally and are spaced from each other.

A knife member 90 having an arcuate sharpened edge 92 is pivotally connected to the vertical leg 78 by a pivot pin 94 and the end of the knife 90 oppositely from the sharpened edge 92 is provided with a transverse handle 96 for urging the knife into a retracted or set position. A tension coil spring 98 is positioned between eyes 100 on the knife member 90 and on the frame 76. The vertical leg member 78 is provided with a struck out lug 102 that extends at right angles to the plane of the vertical leg 78 and an L-shaped latch member 104 is pivoted thereon by pivot pin 106. The vertical leg of the L-shaped member 104 is inturned as indicated by the numeral 108 for engaging the upper edge of the knife 90 and the horizontal leg of the L-shaped member 104 is connected to a tension spring 110 which is anchored to the vertical leg 78 below the pivot pin 106 wherein the L-shaped member 104 is urged about the pivot pin 106 with the inturned end 108 engaging the knife member 90. The portion of the knife member 90 surrounding the pivot pin 94 is provided with a semi-circular portion 112 which provides for riding engagement of the offset end portion 108 during pivotal movement of the knife member 90. The horizontal leg of the L-shaped member 104 is also attached to a wire member or line 114 that is secured to one end of an actuating member 116 that is pivotally mounted on the horizontal portion 80 of the frame 76 by a pivot pin 118. A thumb engaging portion 120 is formed integrally with the actuation member 116 wherein the latch member 104 may be pivoted about pivot pin 106 thereby disengaging the inturned end 108 from the knife member 90 thereby permitting the tension spring 98 to urge the knife 90 about the pivot pin 94 with the sharpened edge 92 swinging down through the loop 86 and between the spaced legs 84 and 88 thereon.

In operation, the loop 86 is dipped into the boiling water and an egg is positioned thereon. With the knife member 90 in its retracted position as illustrated in Figure 4 with the inturned end portion 108 of the L-shaped member 104 engaged over the upper end of the knife 90, the thumb pressure member 120 is pushed downwardly thereby releasing the knife 90 wherein the tension spring 98 will urge the sharpened edge 92 of the knife 90 downwardly through the loop 86 and between the spaced legs 84 and 88. The base of the knife 90 adjacent the semi-circular portion 112 will then engage the outstanding lug 102 thereby limiting the downward pivotal movement of the sharpened edge 92 of the knife 90. The semi-circular portion 112 forms a contact surface for engagement by the spring urged inturned end portion 108 of the L-shaped member 104 thereby preventing the inturned end portion 108 from engaging under the knife portion 90. It will be seen in Figure 5 specifically that the loop shaped member 86 is positioned so that the sharpened edge portion 92 of the knife 90 will engage a central portion of an egg positioned on the loop 86. This eliminates the usual cooling of the egg prior to its opening and also eliminates the burned fingers normally resulting from the removing of eggs from boiling water. Also, this eliminates the running of the egg yolk that usually occurs when a soft boiled egg is opened along its midportion in the usual manner. Obviously, the soft boiled egg cutter may be constructed of any suitable material that is corrosion-proof and easily cleaned that kitchen utensils are normally constructed of and the particular details of construction permit the device to be manufactured by utilizing well known manufacturing procedures and also eliminating any hand operations thereby enhancing the economic feasibility of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A soft boiled egg cutter comprising a frame, a partial loop member secured adjacent one end of said frame, said loop member having spaced end portions, a knife member pivotally mounted on said frame, said knife member having a sharpened edge adapted to pass between the spaced end portions of the loop member for cutting an egg supported thereon, and means for moving said knife member about its pivot point, said frame being generally right angular with the horizontal leg forming a handle for dipping the loop under an egg position in heated water wherein the egg may be removed from the heated water without contact with a person's hand and without cooling the water and egg, said knife moving means including a tension spring interconnecting the knife and frame, and a latch mechanism selectively engaging said knife for retaining the knife in spaced relation to the loop member, said latch mechanism including a remote actuating member for releasing the latch mechanism and permitting the knife member to move towards the loop member, said latch mechanism including a right angled member pivotally mounted on said frame, an inturned end on one leg of said right angled member for engaging over said knife member for retaining the knife in retracted position, said actuating member being connected to said right angled member by a flexible member for pivoting said right angled member about its connection to said frame.

2. An egg cutter comprising a generally right angular frame having a horizontal leg forming a handle and a vertical leg extending downwardly from the end of the horizontal leg, a loop member supported from the lower end of the vertical leg and projecting therefrom in substantially parallel relation to the horizontal leg on the opposite side of the vertical leg therefrom, said loop member having spaced end portions adjacent the lower end of said vertical leg, said loop member being generally oval-shaped with the major axis thereof disposed perpendicularly to said vertical leg for supporting an egg in a similar position thereby permitting the loop member to be inserted into boiling water for engaging under an egg for lifting the same from the water, an elongated knife pivotally mounted on said vertical leg above said loop member, said knife having one end passing through the loop and between the spaced end portions thereof for slotting an egg positioned on said loop member, spring means for urging said knife about its pivotal connection to an egg cutting position, and releasable latch means for retaining the knife in retracted generally horizontal position.

References Cited in the file of this patent

UNITED STATES PATENTS

| | | |
|---|---|---|
| 70,350 | Nathan | Oct. 29, 1867 |
| 2,505,717 | Nastrom | Apr. 25, 1950 |

FOREIGN PATENTS

| | | |
|---|---|---|
| 370,751 | France | May 20, 1904 |